US012612077B2

(12) United States Patent
Han et al.

(10) Patent No.: US 12,612,077 B2
(45) Date of Patent: Apr. 28, 2026

(54) CLASSIFICATION AND PRIORITIZATION OF OBJECTS FOR AUTONOMOUS DRIVING

(71) Applicant: TUSIMPLE, INC., San Diego, CA (US)

(72) Inventors: Charles Seunghwan Han, San Diego, CA (US); Riad I. Hammoud, San Diego, CA (US)

(73) Assignee: CreateAI, Inc., San Diego, CA (US)

( * ) Notice: Subject to any disclaimer, the term of this patent is extended or adjusted under 35 U.S.C. 154(b) by 308 days.

(21) Appl. No.: 18/411,606

(22) Filed: Jan. 12, 2024

(65) Prior Publication Data

US 2024/0149915 A1 May 9, 2024

Related U.S. Application Data

(63) Continuation of application No. 16/933,770, filed on Jul. 20, 2020, now Pat. No. 11,926,343.

(51) Int. Cl.
B60W 60/00 (2020.01)
G01S 17/89 (2020.01)
(Continued)

(52) U.S. Cl.
CPC ......... B60W 60/0016 (2020.02); G01S 17/89 (2013.01); G05D 1/0088 (2013.01);
(Continued)

(58) Field of Classification Search
CPC ..... B60W 2420/403; B60W 2420/408; B60W 2554/00; B60W 60/0016; G01S 13/931;
(Continued)

(56) References Cited

U.S. PATENT DOCUMENTS

| | | |
|---|---|---|
| 10,216,189 B1 | 2/2019 | Haynes |
| 2007/0182587 A1 | 8/2007 | Danz |

(Continued)

OTHER PUBLICATIONS

Image Detection, Recognition, and Classification with Machine Learning, Azati Software Blog, available at https://azati.ai/image-detection-recognition-and-classification-with-machine-learning/.

*Primary Examiner* — Matthew J. Reda
(74) *Attorney, Agent, or Firm* — Perkins Coie LLP

(57) ABSTRACT

An autonomous vehicle can classify and prioritize agent of interest (AOI) objects located around the autonomous vehicle to manage computational resources. An example method performed by an autonomous vehicle includes determining, based on a location of the autonomous vehicle and based on a map, an area in which the autonomous vehicle is operated, determining, based on sensor data received from sensors located on or in the autonomous vehicle, attributes of objects located around the autonomous vehicle, where the attributes include information that describes a status of the objects located around the autonomous vehicle, selecting, based at least on the area, a classification policy that includes a plurality of rules that are associated with a plurality of classifications to classify the objects, and for each of the objects located around the autonomous vehicle: monitoring an object according to a classification of the object based on the classification policy.

15 Claims, 6 Drawing Sheets

(51) Int. Cl.

| | |
|---|---|
| *G05D 1/00* | (2006.01) |
| *G05D 1/246* | (2024.01) |
| *G05D 1/247* | (2024.01) |
| *G05D 1/249* | (2024.01) |
| *G05D 1/81* | (2024.01) |

(52) U.S. Cl.
CPC ......... *G05D 1/0246* (2013.01); *G05D 1/0257* (2013.01); *G05D 1/0274* (2013.01); *G05D 1/246* (2024.01); *G05D 1/247* (2024.01); *G05D 1/249* (2024.01); *G05D 1/81* (2024.01); *B60W 2420/403* (2013.01); *B60W 2420/408* (2024.01)

(58) Field of Classification Search
CPC ..... G01S 17/89; G01S 17/931; G05D 1/0088; G05D 1/0246; G05D 1/0257; G05D 1/0274; G05D 1/246; G05D 1/247; G05D 1/249; G05D 1/81; G06V 20/58
See application file for complete search history.

(56) References Cited

U.S. PATENT DOCUMENTS

| | | | |
|---|---|---|---|
| 2010/0328644 | A1* | 12/2010 | Lu .......................... H04N 23/57 |
| | | | 356/5.01 |
| 2012/0008129 | A1 | 1/2012 | Lu et al. |
| 2017/0120804 | A1* | 5/2017 | Kentley ................. G08G 1/167 |
| 2017/0345309 | A1 | 11/2017 | Bostick et al. |
| 2018/0365888 | A1 | 12/2018 | Satzoda et al. |
| 2019/0113927 | A1 | 4/2019 | Englard et al. |
| 2019/0227539 | A1* | 7/2019 | Golgiri .................... B62D 1/00 |
| 2020/0159215 | A1* | 5/2020 | Ding .................... G05D 1/0221 |
| 2020/0172098 | A1 | 6/2020 | Abrahams |
| 2020/0209869 | A1 | 7/2020 | Toyoura et al. |
| 2021/0001874 | A1 | 1/2021 | Wang et al. |
| 2021/0309214 | A1 | 10/2021 | Hashimoto et al. |
| 2022/0009520 | A1* | 1/2022 | Lindholm ......... B60W 30/0956 |
| 2022/0017113 | A1 | 1/2022 | Han et al. |
| 2022/0122453 | A1* | 4/2022 | Parenti ................... B60Q 5/00 |
| 2022/0222475 | A1* | 7/2022 | Oesterling ............. G08G 1/166 |

* cited by examiner

Select a classification policy based on a location of an autonomous vehicle and a previously stored map information 202

Classify AOIs located around the autonomous vehicle 204

Analyze sensor data by employing a computationally efficient process based on classification of the AOIs 206

400

| MEMORY 405 | PROCESSOR(S) 410 | TRANSMITTER 415 |
| RECEIVER 420 | SENSOR DATA PROCESSING MODULE 425 | AOI PRIORITIZATION MODULE 430 |
| MAP DATABASE 435 | AOI ATTRIBUTE DATABASE 440 | CLASSIFICATION POLICIES DATABASE 445 |

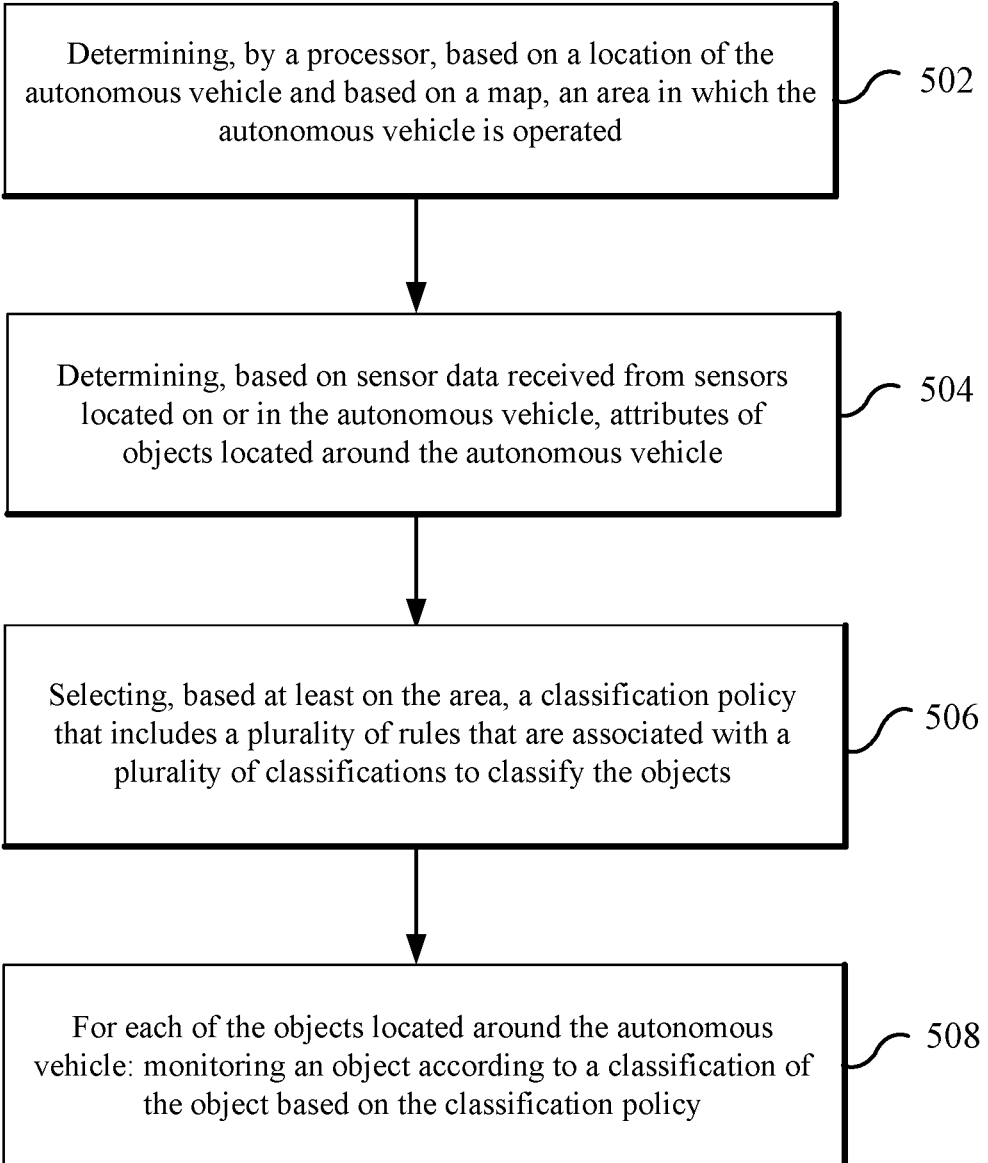

Determining, by a processor, based on a location of the autonomous vehicle and based on a map, an area in which the autonomous vehicle is operated — 502

Determining, based on sensor data received from sensors located on or in the autonomous vehicle, attributes of objects located around the autonomous vehicle — 504

Selecting, based at least on the area, a classification policy that includes a plurality of rules that are associated with a plurality of classifications to classify the objects — 506

For each of the objects located around the autonomous vehicle: monitoring an object according to a classification of the object based on the classification policy — 508

FIG. 5

CLASSIFICATION AND PRIORITIZATION OF OBJECTS FOR AUTONOMOUS DRIVING

CROSS-REFERENCE TO RELATED APPLICATIONS

This patent application is a continuation of and claims priority to and the benefit of U.S. patent application Ser. No. 16/933,770, filed on Jul. 20, 2020. The aforementioned application is incorporated herein by reference in its entirety.

TECHNICAL FIELD

This document relates to techniques to classifying and prioritizing objects located around an autonomous vehicle to efficiently manage computational resources onboard the autonomous vehicle.

BACKGROUND

A vehicle may include sensors for several purposes. For example, cameras may be attached to a roof of the vehicle for security purposes, for driving aid, or for facilitating autonomous driving. Cameras and/or light detection and ranging (LiDAR) sensors mounted on a autonomous vehicle can obtain sensor data (e.g., images or point cloud map) of one or more areas surrounding the vehicle. A server can process the sensor data to obtain information about the road and/or about the objects surrounding the autonomous vehicle. Thus, the sensor data obtained from the sensors on an autonomous vehicle can be used to safely maneuver the autonomous vehicle through traffic or on a highway.

SUMMARY

An autonomous vehicle can classify and prioritize agent of interest (AOI), also known as objects, located around the autonomous vehicle to manage computational resources. An AOI can include vehicles, pedestrians, bicycle, etc., The autonomous vehicle can classify the AOI located around the autonomous vehicle into two or more classifications based on predetermined characteristics such as, for example, whether an AOI is located in front of and in a same lane as the autonomous vehicle, whether an AOI is behind the autonomous vehicle, whether an AOI is an emergency vehicle (e.g., fire engine, ambulance, etc.), or whether the AOI located in front of the autonomous vehicle is being driven on a lane that will merge into a lane in which the autonomous vehicle is operating. Thus, the autonomous vehicle can efficiently manage computational resources onboard the autonomous vehicle based on the AOI's classifications to analyze attributes (e.g., speed, direction of travel) of the AOIs.

An example method performed in an autonomous vehicle comprises determining, by a processor, based on a location of the autonomous vehicle and based on a map, an area in which the autonomous vehicle is operated; determining, based on sensor data received from sensors located on or in the autonomous vehicle, attributes of objects located around the autonomous vehicle, where the attributes include information that describes a status of the objects located around the autonomous vehicle; selecting, based at least on the area, a classification policy that includes a plurality of rules that are associated with a plurality of classifications to classify the objects; and for each of the objects located around the autonomous vehicle: monitoring an object according to a classification of the object based on the classification policy.

The following features can be present in the methods, systems, apparatus, and non-transitory computer readable storage medium in any reasonable combination. In some embodiments, the monitoring the object includes: assigning the classification to the object based on the classification policy and based on an attribute of the object; and determining updated attributes of the object by analyzing additional sensor data received after the sensor data is received, wherein the additional sensor data is analyzed using a frequency associated with the classification of the object. In some embodiments, each rule specifies one or more attributes of one object and each rule is associated with one classification, and each classification indicates a frequency with which the updated attributes of the objects are determined. In some embodiments, the assigning the classification to the object includes determining that the object is associated with the attribute that is same as that included in a rule in the plurality of rules.

In some embodiments, the assigning the classification to the object based on the classification policy and based on the attribute of the object includes: determining, based on the attribute of the object, that the object is an emergency vehicle; and assigning, to the emergency vehicle, the classification associated with a highest frequency with which updated attributes of the emergency vehicle are determined. In some embodiments, the assigning the classification to the object includes: determining that the object is associated with the attribute that is same as that included in two rules in the plurality of rules, where the two rules are associated with two classifications that are indicative of two different frequencies with which the updated attributes of the objects are to be determined; and assigning, based on the determining that the attribute of the object is associated with two rules, the classification to the object, wherein the classification is associated with the frequency that is higher of the two different frequencies.

In some embodiments, the example method further comprises changing, for at least one object located around the autonomous vehicle, a classification from a first classification to a second classification based on updated attributes determined for the at least one object, where the first classification is associated with a first frequency with which the updated attributes of the at last one object are determined, where the second classification is associated with a second frequency with which the updated attributes of the at least one object are to be determined after the changing the classification, and where the second frequency is different from the first frequency. In some embodiments, the plurality of classifications includes a first classification and a second classification, the objects located around the autonomous vehicle includes a first object and a second object, the assigning includes assigning the first classification to the first object and assigning the second classification to the second object, the first classification indicates that a first set of updated attributes for the first object are determined at a first frequency, the second classification indicates that a second set of updated driving related attributes for the second object are determined at a second frequency that is different from the first frequency, and the updated attributes of the first object and the second object are determined based on the first frequency and the second frequency, respectively.

In some embodiments, the classification policy is selected based on: the area in which the autonomous vehicle is operated, and a number of objects located within a predetermined distance of the location of the autonomous vehicle. In some embodiments, the area includes a highway or a freeway. In some embodiments, the processor is configured to: perform a first determination, based on the location of the autonomous vehicle and based on the map, that the autonomous vehicle is operated at the traffic intersection or is operating within a pre-determined distance of the traffic intersection; and perform a second determination, based on the first determination, that the area is a traffic intersection. In some embodiments, the sensors include cameras, light detection and ranging (LiDAR) sensors, or Radars.

In some embodiments, the monitoring the object includes: assigning the classification to the object based on the classification policy and based on an attribute of the object; and determining updated attributes of the object by analyzing additional sensor data received after the sensor data is received, wherein the additional sensor data is analyzed based on the classification of the object. In some embodiments, the attribute includes a distance from the object to the location of the autonomous vehicle. In some embodiments, the object includes a vehicle. In some embodiments, the attribute of the vehicle or the updated attributes of the vehicle includes a speed of the vehicle. In some embodiments, the attribute of the vehicle or the updated attributes of the vehicle includes a predicted trajectory of the vehicle or a driving pattern of the vehicle. In some embodiments, the object includes a pedestrian.

In yet another exemplary aspect, the above-described method is embodied in the form of processor-executable code and stored in a computer-readable program medium or a computer-readable storage medium. Thus, a non-transitory computer readable storage medium can have code stored thereon, where the code, when executed by a processor, causes the processor to implement the above-described methods and/or the methods described in this patent document.

In yet another exemplary embodiment, an image processing apparatus or device that includes a processor that is configured or operable to perform the above-described methods and/or the methods described in this patent document is disclosed.

In yet another exemplary embodiment, a system comprising a computer that includes a processor and a memory comprising stored instructions that upon execution configure the processor to perform the above-mentioned methods and/or the methods described in this patent document is disclosed.

The above and other aspects and their implementations are described in greater detail in the drawings, the descriptions, and the claims.

BRIEF DESCRIPTION OF THE DRAWING

FIG. 5 shows an example flowchart of a computationally efficient process to classify and analyze AOIs.

DETAILED DESCRIPTION

Figure 1:
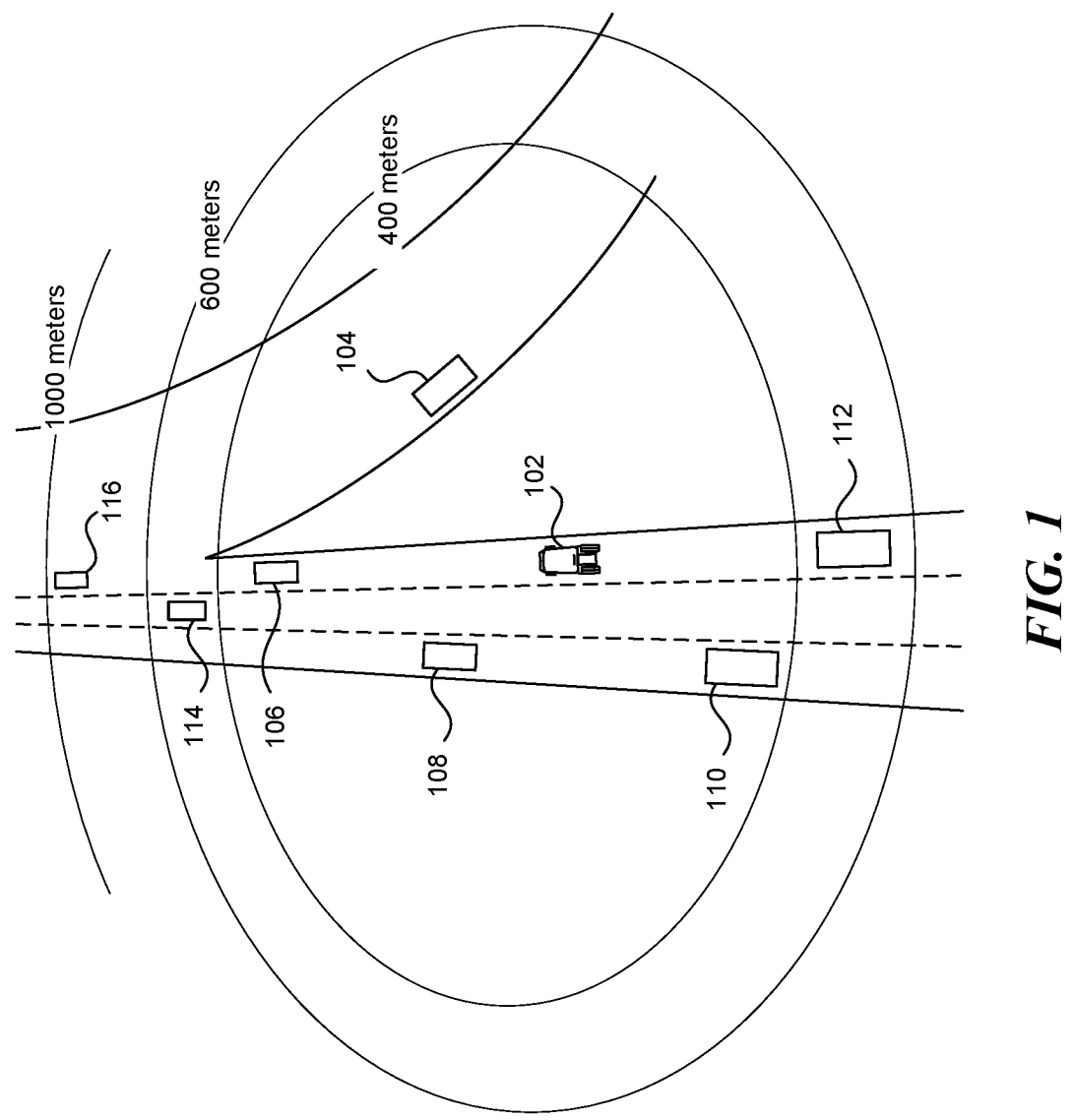
FIG. 1 shows an example scenario where an autonomous vehicle is operated on a highway.

An autonomous vehicle includes several sensors that gather sensor data of an environment in which the autonomous vehicle operates. Sensors, such as cameras located on the roof the autonomous vehicle and pointing forwards of a front region of the autonomous vehicle, can obtain images of an area in front of the autonomous vehicle. Similarly, cameras that point towards the side and rear of the autonomous vehicle can respectively obtain images of the sides and rear of the autonomous vehicle. Other sensors such as Radars and Light Detection and Ranging (LiDAR) sensors located on the autonomous vehicle can also obtain sensor data of areas located around the autonomous vehicle. The sensor data obtained by the cameras, Radars (e.g., radar systems), and/or LiDAR sensors are processed by one or more onboard computers located in this autonomous vehicle.

The one or more onboard computers can determine whether agents of interests (AOIs), also known as objects, exist around the autonomous vehicle from the sensor data. An AOI can include a vehicle, a pedestrian, a bicycle, etc., Based on the sensor data, the one or more onboard computers also determine attributes (e.g., speed, direction of travel, predicted trajectory, distance from the autonomous vehicle) of the AOIs so that the one or more onboard vehicle can determine a driving-related operation of the autonomous vehicle. For example, if an onboard computer determines that a car located 400 feet in the same lane as and in front of the autonomous vehicle is slowing down, the onboard computer can instruct the autonomous vehicle to apply brakes to maintain a proper distance between the autonomous vehicle and the car or to safely stop. The attributes can be determined for each AOI located in an environment in which the autonomous vehicle is driven. A process by which the one or more onboard computers determine the multiple attributes of an AOI can also be referred to as planning process.

There are several scenarios in which the one or more onboard computers uses considerable computational resources to perform the planning process to determine attributes of the AOIs located around the autonomous vehicle. For example, an autonomous vehicle can perform the same planning process for two vehicle, such as one located in front of the autonomous vehicle and another located behind the autonomous vehicle, by analyzing the sensor data for the two vehicles. However, such a technique for analyzing sensor data does not efficiently manage computational resources at least because both vehicles are implicitly classified as being equally important even though the attributes of the vehicle in front of the autonomous vehicle may be more consequential to the driving-related operation of the autonomous vehicle than the attributes of the vehicle behind the autonomous vehicle. Furthermore, there are several scenarios (e.g., a traffic intersection) in which the complexity of the planning process can greatly increase because the number of AOIs can be high. Thus, the ability to decrease computational resources to perform planning process on AOIs based on classification and prioritization of AOIs is at least one technical benefit of the technology described herein. Another technical benefit of the disclosed technology is that by reducing the amount of processing needed by a processor(s) (e.g., central processing unit (CPU) or graphic processing unit (GPU)), the amount of heat generated by the processor(s) can be reduced, which is advantageous for the one or more onboard computers located in the autonomous vehicle.

The computationally efficient process described herein is described in two sections below. The Section I describes a location-based classification policy and Section II describes a traffic-based classification policy. The example headings for the various sections below are used to facilitate the understanding of the disclosed subject matter and do not limit the scope of the claimed subject matter in any way. Accordingly, one or more features of one example section can be combined with one or more features of another example section. Thus, for example, a classification policy can be developed by combining the techniques of the location-based classification policy and the traffic-based classification policy.

I. Location-Based Classification Policy

FIG. 1 shows an example scenario where an autonomous vehicle 102 is operated on a highway or a freeway. In a multi-sensor setup, the autonomous vehicle 102 includes multiple sensors that may be mounted on top of the autonomous vehicle 102 that can allow an onboard computer located in the autonomous vehicle 102 to obtain sensor data of multiple areas surrounding the autonomous vehicle. For example, an autonomous vehicle 102 may be a semi-trailer truck with sensors that may be mounted on top of a semi-trailer truck and pointed in multiple directions so that the onboard computer can obtain sensor data of areas all around (or 360 degrees) of the location of the semi-trailer truck. In a multi-sensor setup, the autonomous vehicle 102 may include sensors such as cameras, LiDAR sensors, Radars (e.g., radar systems), or any combination thereof.

The sensor data processing module in the onboard computer (shown as 425 in FIG. 4) can continually obtain sensor data from the multiple sensors on the autonomous vehicle's 102, where the sensor data can be time-stamped. In the scenario shown in FIG. 1, the sensor data processing module can process the obtained sensor data to determine a presence of seven vehicles 104 to 116 (i.e., vehicles 104, 106, 108, 110, 112, 114, and 116) located around the autonomous vehicle 102. The seven vehicles 104 to 116 are seven AOIs. Based on the obtained sensor data, the sensor data processing module can also determine attributes (e.g., speed, distance from autonomous vehicle, trajectory, lane of AOI relative to autonomous vehicle's 102 lane, etc.) related to seven vehicles 104 to 116. For each AOI, the attributes can describe a status of an AOI. For example, a status related information indicated by an attribute may include a speed of a vehicle (e.g., 0 mph for a stationary vehicle or 50 mph), or distance of the vehicle from the autonomous vehicle, or as further described in this patent document, a predicted trajectory of the vehicle or a driving pattern of the vehicle based on historical sensor data. The attributes determined for the AOIs can be stored over time in an AOI attribute database stored in the onboard computer (shown as 440 in FIG. 4). The vehicles 104 to 116 are located in various perception ranges indicated as 400 meters, 600 meters, and 1000 meters in FIG. 1.

Without the computationally efficient process described herein, the sensor data processing module can continue to analyze each set of sensor data provided over time to determine for each of the vehicles 104 to 116 attributes such as trajectories, velocity estimation, trajectory prediction, distance from the autonomous vehicle (AV), relative lane, and the like. The analysis of these data can be a time-consuming process. Such a sensor data processing technique can also be a computationally intensive process at least because of the combinatorial complexity of determining what the vehicles 104 to 116 will do in the next several seconds, and additionally, or alternatively, because of the numbers of images or sensor data features needed for the sensor data processing module obtain attribute information. Furthermore, such sensor data processing techniques can be computationally intensive when an autonomous vehicle is operated in a dense traffic area or in traffic jam. To address at least these technical problems, computationally efficient processes are further described herein.

Figure 2:
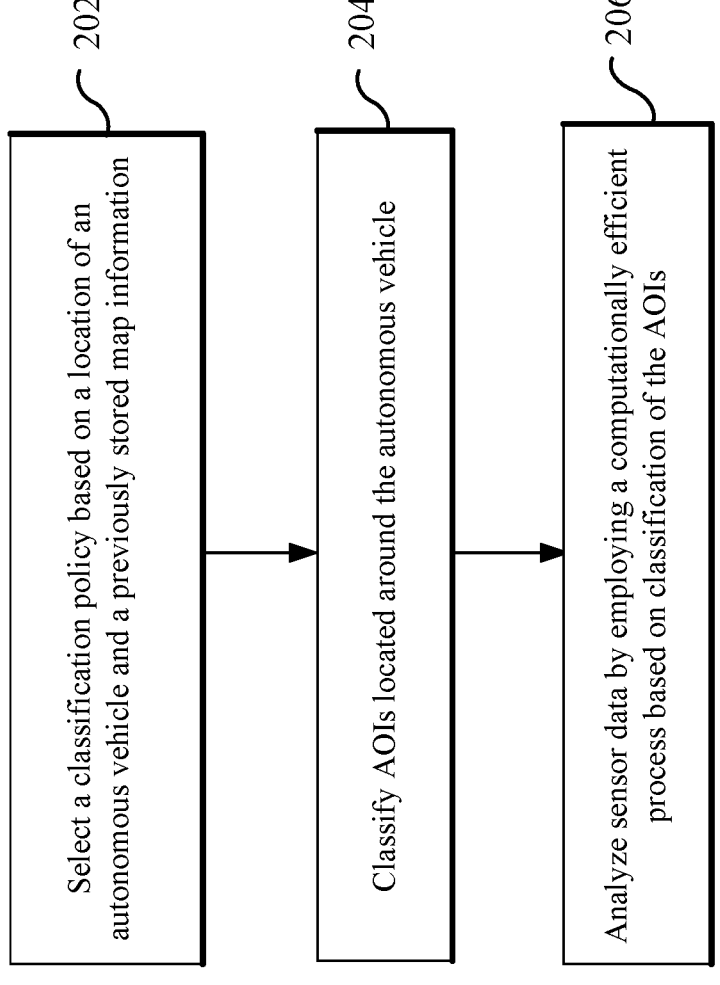
FIG. 2 shows an example flowchart of a computationally efficient process based on agent of interest (AOI) classification and prioritization.

FIG. 2 shows an example flowchart of a computationally efficient process based on AOI classification and prioritization. At operation 202, an AOI prioritization module in the onboard computer (shown as 430 in FIG. 4) can select, based on a location of an autonomous vehicle and a previously stored map database or map information (shown as 435 in FIG. 4), a classification policy to classify AOIs whose presence around the autonomous vehicle is determined from sensor data by the sensor data processing module. For example, the AOI prioritization module can determine, based on the location of the autonomous vehicle and based on the previously stored map database, that the autonomous vehicle is being operated on a highway or at or within a pre-determined distance (e.g., 100 meters) of a traffic intersection that may have a stop sign or traffic lights. The AOI prioritization module can obtain the location of the autonomous vehicle from a global positioning system (GPS) transceiver located in the autonomous vehicle. After the AOI prioritization module determines a context (e.g., highway, traffic intersection, etc.) within which the autonomous vehicle is being driven, the AOI prioritization module can select a pre-determined classification policy associated with the context.

Figure 4:
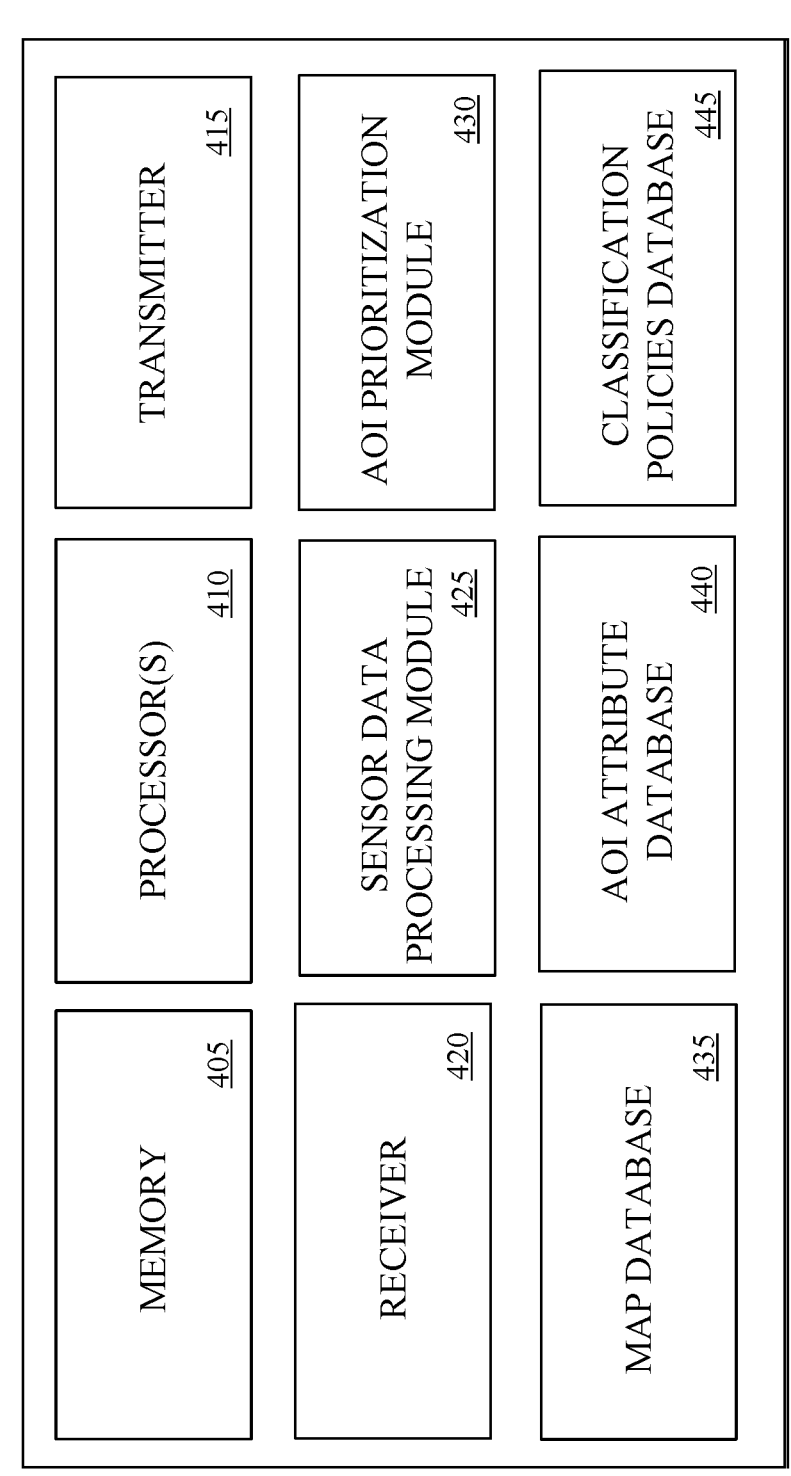
FIG. 4 shows an exemplary block diagram of an onboard computer located in an autonomous vehicle.

At operation 202, the classification policy can be selected from classification policies included in a classification policies database stored in the onboard computer (shown as 445 in FIG. 4). The classification policies database can include a plurality of pre-determined classification policies where each classification policies includes rules with which the AOI prioritization module can classify the AOIs located around the autonomous vehicle.

The classification policy can include a pre-determined plurality of rules to apply to classify the AOIs located around the autonomous vehicles into a plurality of categories. For example, in FIG. 1, the AOI prioritization module can determine that the autonomous vehicle 102 is being operated on a highway based on the location of the autonomous vehicle 102 and based on the previously stored map database. The AOI prioritization module can select a classification policy associated with the highway. An example of the plurality of rules associated with a classification policy for highways is shown in Table 1 below. Based on the selected classification policy, the AOI prioritization module can perform operation 204 in which AOIs located around the autonomous vehicle are classified by determining whether an attribute of the AOIs is the same as an attribute included in the rules of the classification policy. The classification of an AOI indicates the likelihood of the AOI affecting the driving-related operation (e.g., steering, braking, throttle, etc.) of the autonomous vehicle 102. For example, based on the classification policy of Table 1 and based on the attributes of the vehicles 104 to 116, the AOI prioritization module can classify vehicles 104, 106, 108, 110 as "track persistently" because the AOI prioritization module can determine that the distance of vehicles 104, 106, 108, 110 from the autonomous vehicle is less than 400 meters. In this example, the AOI prioritization module can determine that the distance attribute of each of vehicles 104, 106, 108, 110 is the same as the attribute of the AOI indicated by the first rule in Table 1 (i.e., AOI located within 400 meters). The vehicles 104, 106, 108, and 110 have a high likelihood of affecting the autonomous vehicle's 102 driving-related operation at least because they are located close to the autonomous vehicle 102. Continuing with the above-mentioned example, based on the classification policy of Table 1, the AOI prioritization module can classify vehicles 112, 114, 116 as "track less frequently" because the AOI prioritization module can determine that the distance of vehicles 112, 114, 116 is more than 400 meters from the location of the autonomous vehicle. In this example, the AOI prioritization module can determine that the distance attribute of each of vehicles 112, 114, 116 is the same as the attribute of the AOI indicated by the second rule in Table 1 (i.e., AOI located more than 400 meters). The vehicles 112, 114, 116 have a low likelihood of affecting the autonomous vehicle's 102 driving-related operation at least because they are located far away from the autonomous vehicle 102. Vehicles 108 and 110 are located two lanes away from the autonomous vehicle, and vehicle 114 is located one lane away from the autonomous vehicle.

<center>TABLE 1</center>

| Classification Policy for Highway | |
| --- | --- |
| Rules | AOI Classification |
| AOI located within 400 meters | Track persistently |
| AOI located more than 400 meters | Track less frequently |
| AOI located more than two lanes away from autonomous vehicle's lane | Track less frequently |

Based on the classification policy, the sensor data processing module can perform operation 206 to analyze sensor data by using a computationally efficient process based on the AOI classification. In some embodiments, based on the classification rule shown in Table 1, the sensor data processing module can determine attributes for vehicles 110, 112, 114, and 116 that are classified "track less frequently" at a first frequency that is lower than a second frequency used to determine attributes for AOIs classified as "track persistently." For example, the sensor data processing module can, based on the "track less frequently" classification for vehicles 110, 112, 114, and 116, analyze sensor data received after the vehicles 110, 112, 114, and 116 have been classified at a rate of 5 times per second. For the vehicles 104, 106, 108 that are classified as "track persistently," the sensor data processing module can determine the attributes of vehicles 104, 106, 108 at a second frequency using the sensor data obtained by the sensor data processing module. For example, based on the "track persistently" classification, the sensor data processing module can determine attributes of vehicles 104, 106, 108 at a frequency of 20 times per second.

The location-based classification policy and the traffic-based classification policy (described in Section II below) can be used to classify vehicles based on the vehicle's attributes. In some embodiments, the sensor data processing module can, based on the sensor data provided by the autonomous vehicle, perform a general classification by classifying AOIs as vehicles (e.g., cars, trucks, etc.), bicycles, pedestrians, etc., The sensor data processing module can also determine attributes of the AOIs. For example, once the AOIs have been classified as vehicles, bicycles, pedestrians, etc., the sensor data processing module can determine whether the AOIs are coming towards or going away from the autonomous vehicle. The sensor data processing module can determine additional attributes of the AOIs such as acceleration, deceleration, changes in direction, etc., that can impact the autonomous vehicle's driving-related operation. Vehicles with high probability of impacting the autonomous vehicle's driving-related operation can be those AOIs that are located and/or traveling in front of the autonomous vehicle, or traveling on lanes immediately adjacent to the autonomous vehicle's lane, or vehicles with erratic or frequent lane changes, or vehicle traveling at speeds far exceeding speed limit.

For example, using the scenario shown in FIG. 1, the sensor data processing module can determine that the vehicle's 110 speed exceeds a pre-determined speed limit for the highway, which can be determined from the map database, and the AOI prioritization module can classify the vehicle 110 as "track persistently." In another example, using the scenario shown in FIG. 1, the sensor data processing module can determine that the number of times that the vehicle 114 has changed lanes over a pre-determined time period exceeds a pre-determined threshold value. In such a situation, the AOI processing module can classify the vehicle 114 as a "track persistently" even though vehicle 114 is located beyond 400 meters of the autonomous vehicle 102. In some embodiments, vehicles with low probability of impacting the autonomous vehicle's driving-related operation can be those that are traveling slower and behind the autonomous vehicle, or vehicles that are two or three lanes away from the lane on which the autonomous vehicle is operated, or vehicles traveling at a constant speed without any lane changes over a pre-determined time period.

Once the AOIs are classified and prioritized based on their likelihood of impacting the autonomous vehicle's driving-related operation, those AOIs classified as having a high tracking priority can be monitored from sensor data at a frequency higher than those AOIs classified with a low tracking priority. For example, using the classification described in Table 1, the AOIs classified as "track persistently" can have their attributes updated by the sensor data processing module at 10 times per second based on the received sensor data, whereas the AOIs classified as "track less frequently" can have their attributes updated by the sensor data processing module at 3 times per second based on the received sensor data. In some embodiments, the AOIs classified as "track persistently" can have their attributes updated at the highest possible frequency. Thus, for example, an emergency vehicle classified as "track persistently" can have its attributes updated at the highest frequency.

As shown below, Table 2 includes another example of a classification policy for highway.

<center>TABLE 2</center>

| Classification Policy for Highway | |
| --- | --- |
| Rules | AOI Classification |
| AOI located within 400 meters of autonomous vehicle (AV) and in same lane or in a lane immediately adjacent to the AV's lane | Track persistently |
| AOI located more than 400 meters away from AV | Track less frequently |
| AOI located on an on-ramp and the autonomous vehicle's lane is a merging lane | Track persistently |

Using Table 2 and using the information determined by the sensor data processing module, the AOI prioritization module can classify vehicle 104 as "track persistently" because the AOI prioritization module can determine that an attribute of vehicle 104 is the same as an attribute of the first rule indicated in Table 1. In this scenario, the sensor data processing module determines, for vehicle 104, an attribute that indicates that vehicle 104 is on an on-ramp, and the sensor data processing module determines that the autonomous vehicle is in a merging lane by performing signal processing on the sensor data. Furthermore, by comparing the attributes of AOIs listed in Table 2 with the attributes information providing by the sensor data processing module, the AOI prioritization module can classify vehicle 106 as "track persistently" because the AOI prioritization module determines that vehicle 106 is within 400 meters of the location of the autonomous vehicle and in a same lane as the autonomous vehicle by determining attributes of vehicle 106 and by performing signal processing on the sensor data to determine a lane associated with the vehicle 106. Based on Table 2 and using the attributes information determined by the sensor data processing module, the AOI prioritization module can classify vehicles 112, 114, and 116 as "track less frequently" because AOI prioritization module determine that vehicles 112, 114, and 116 are located more than 400 meters from the autonomous vehicle's location.

In some embodiments, other types of classifications are possible for a classification policy. For example, AOIs can be classified as one of three categories: aggressive tracking, novice tracking, or domicile tracking. An AOI that is classified as "aggressive tracking" by the AOI prioritization module can indicate to the sensor data processing module to frequently determine the attribute of the AOI. Thus, the "aggressive tracking" AOI can be an AOI that has a high probability of affecting the autonomous vehicle's driving-related operation. For example, the AOIs classified as "aggressive tracking" can have their attributes updated by the sensor data processing module at 20 times per second based on the received sensor data.

If AOIs are classified as "novice tracking," such AOIs have a medium probability of affecting the autonomous vehicle's driving-related operation. In some embodiments, the "novice tracking" classification is associated with an AOI whose driving pattern, based on historical sensor data, indicates that the AOI's driving-related operation or movements are erratic or not constant. For example, if the sensor data processing module determines from the sensor data that a number of times that an AOI has changed lanes is exceeds a pre-determined threshold (e.g., 3 times) over a predetermined time (e.g., within 5 seconds), then the sensor data processing module can indicate to the AOI prioritization module to classify that that AOI should be classified as "novice tracking." An AOI classified as a "novice tracking" can be tracked less frequently than an "aggressive tracking" AOI but more frequently than the "domicile tracking" AOI. For example, the AOIs classified as "novice tracking" can have their attributes updated by the sensor data processing module at 10 times per second based on the received sensor data.

If AOIs are classified as "domicile tracking," such AOIs have a low probability of affecting the autonomous vehicle's driving-related operation. The "domicile tracking" classification may be associated with an AOI whose attributes indicate that that AOI is unlikely to make any changes over the next pre-determined time period (e.g., the next 3 seconds). The sensor data processing module can determine, as an attribute of an AOI, that the AOI is unlikely to make changes over the next pre-determined time period based on analyzing the historical sensor data for that AOI. For example, if the sensor data processing module determines from the sensor data that the AOI has not changed lanes for more than a threshold time value (e.g., more than 20 seconds), then the sensor data processing module can determine that that AOI is unlikely to change lanes in the next pre-determined time period. In this example, the sensor data processing module can predict trajectory of the AOI based on past AOI driving behavior. The sensor data processing module can indicate in the attribute of the AOI that the AOI is unlikely to change lanes in the next pre-determined time period, and based on this attribute information, the AOI prioritization module can classify the AOI as "domicile tracking." An AOI classified as a "domicile tracking" can be tracked less frequently than an "aggressive tracking" AOI and a "novice tracking" AOI. For example, the AOIs classified as "domicile tracking" can have their attributes updated by the sensor data processing module at 5 times per second based on the received sensor data In some embodiments, if an AOI is determined to be associated with two different classifications, the AOI prioritization module can select a classification having a higher tracking priority for that AOI. For example, using the classification policy in Table 1, the AOI prioritization module can classify a vehicle is more than two lanes away but is within 400 meters of the location of the autonomous vehicle as "track persistently." In some other embodiments, if an AOI is determined to be associated with two different classification, the AOI prioritization module can select a classification having a lower tracking priority for that AOI. For example, using the classification policy in Table 1, the AOI prioritization module can classify the AOI located two lanes away and within 400 meters as "track less frequently."

In some embodiments, if an AOI is determined not to be associated any classification, the AOI prioritization module can select a classification having a higher tracking priority for that AOI. For example, using the rules shown in Table 2, the AOI prioritization module determines that vehicles 108 and 110 are not associated with any classification at least because the AOI prioritization module determines that the attributes of the vehicles 108 and 110 are not the same as, or do not match, the attributes in Table 2. In such situations, the AOI prioritization module can determine that the vehicles 108 and 110 can be classified as "track persistently."

Figure 3:
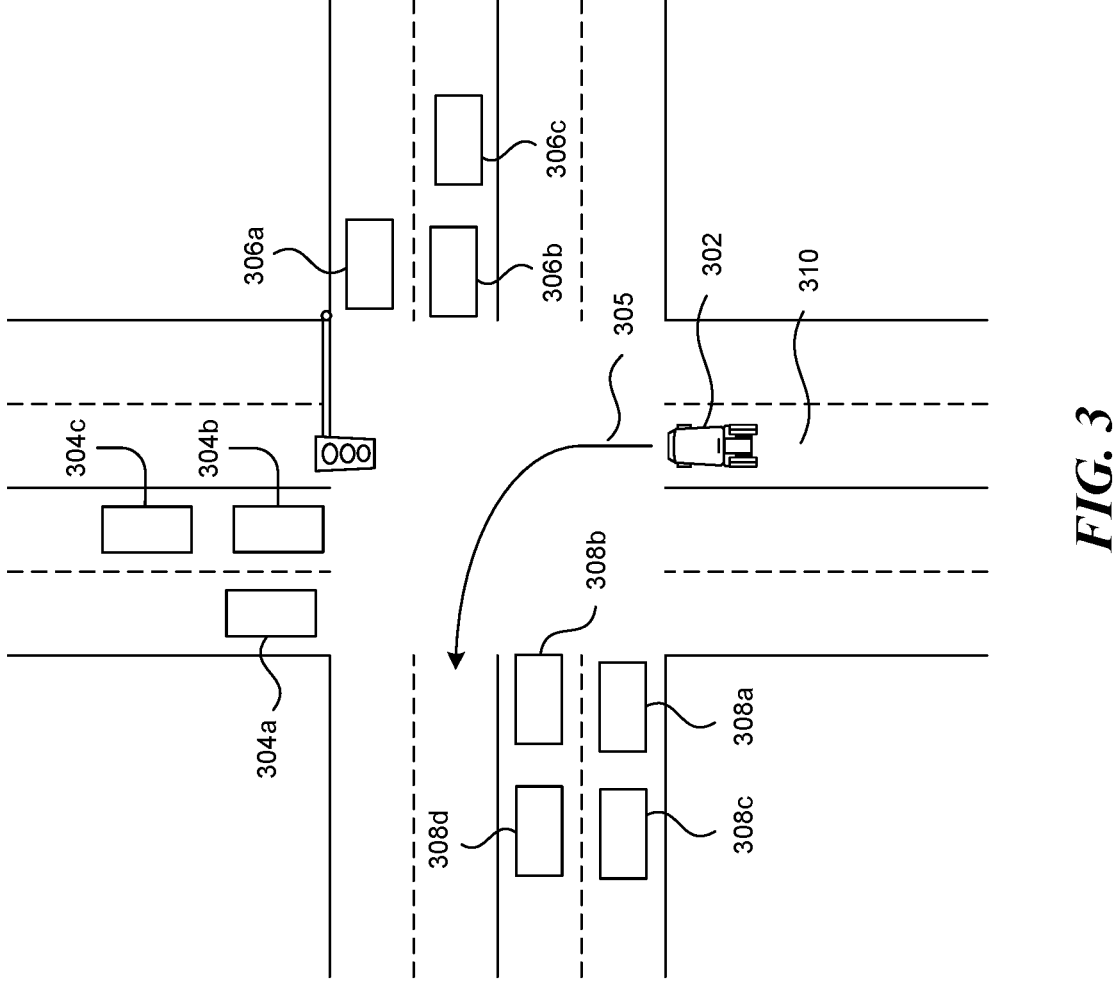
FIG. 3 shows another example scenario where an autonomous vehicle is operated on, at, or near a traffic intersection.

FIG. 3 shows another example scenario where an autonomous vehicle 302 is operated on at or near a traffic intersection. In the scenario shown in FIG. 3, the autonomous vehicle 302 is at a signal light or stop sign and the planned trajectory indicates that the autonomous vehicle 302 needs to turn left as indicated by the arrow 305 in FIG. 3. Using the computationally efficient process of FIG. 2, the AOI prioritization module can determine, based on a location of an autonomous vehicle and a previously stored map database, that the autonomous vehicle 302 is located at, or within a pre-determined distance of, a traffic intersection. Accordingly, the AOI prioritization module can determine a pre-determined classification policy associated with a traffic intersection.

Based on the classification policy and based on information about the vehicles 304a, 304b, 304c, 306a, 306b,306c, 308a, 308b, 308c, 308d provided by the sensor data processing module, the AOI prioritization module can classify the vehicles 304a, 304b, 306a-306c, 308a-308d. The sensor data processing module can, based on sensor data received from the sensors onboard the autonomous vehicle 302, determine attributes of the vehicles 304a-304c, such as determining that the vehicles 304a-304c are located in lanes parallel to and opposite the autonomous vehicle's 310 lane. The sensor data processing module can also obtain other attributes such as whether the vehicles 304a-304c are stopped, whether the vehicles 304a-304c are moving and the direction of the travel, the distances from the autonomous vehicle 302 to the vehicles 304a-304c, and the like. The sensor data processing module can also determine that among vehicles 304a-304c, the two vehicles 304a, 304b are the AOIs that are the closest to the autonomous vehicle 302 in the two opposite lanes. Similarly, the sensor data processing module can determine attributes of the vehicles 306a-306c and 308a-308d.

Based on a classification policy and based on the attributes of the vehicles 304a-304c, 306a-306c, 308a-308d determined by the sensor data processing module, the AOI prioritization module can classify the vehicles 304a-304c, 306a-306c, 308a-308d. In one example, vehicles 304a, 304b, 306a, 306b, 308a, 308b can be classified as "track persistently" because the AOI prioritization module can determine that these vehicles have a high probability of affecting the autonomous vehicle's 302 driving-related operation because of the location of these vehicles relative to the autonomous vehicle 302 makes these vehicles. The AOI prioritization module can determine that vehicles 304a, 304b, 306a, 306b, 308a, 308b are the first set of vehicles located in lanes opposite to or adjacent to the lane on which the autonomous vehicle 302 operates. In this example, vehicles 304c, 306c, 308c, 308d can be classified by the AOI prioritization module as "track less frequently" because these vehicles are located behind the first set of vehicles, and as such, the probability of their driving attributes affecting the driving-related operation of the autonomous vehicle 302 is low.

The pre-determined classification policy for a traffic intersection can include rules such as classifying AOIs located within a pre-determined distance (e.g., 50 meters) from a center of the traffic intersection as "track persistently" and classify AOIs located beyond the pre-determined distance as "track less frequently," or classifying moving or static AOIs located within 10 degrees of a trajectory of the autonomous vehicle 302 and in a lane opposite to the autonomous vehicle 302 as "track persistently."

II. Traffic-Based Classification Policy

In some embodiments, a pre-determined classification policy can include rules that can classify AOIs by determining traffic density in one or more perception range in front of the autonomous vehicle. A plurality of perception ranges (e.g., 400 meters, 600 meters, 1000 meters) is shown in FIG. 1, where the perception ranges are determined from the location of the autonomous vehicle 102. In FIG. 1, the sensor data processing module can determine the distances of the seven vehicles 104, 106, 108, 110, 112, 114, and 116 (vehicles 104 to 116) from the location of the autonomous vehicle 102. As a result, the sensor data processing module can classify the vehicles 104 into a plurality of perception ranges based on the distances of the vehicles 104 to 116. As an example, as shown in FIG. 1, vehicles 104 to 110 can be considered to be vehicles in a near perception range because they are less than 400 meters from the autonomous vehicles' 102 position. Vehicles 112 and 114 can be considered to be vehicles in a mid-perception range because they are between 400 meters and 600 meters from the autonomous vehicles' 102 position. And, vehicle 116 can be considered a vehicle in a far perception range because it is more than 600 meters from the autonomous vehicles' 102 position. In some embodiments, the near perception range can include AOIs within 100 meters of the autonomous vehicle's 102 position, the mid-perception range can include AOIs between 100 meters and 250 meters from the location of the autonomous vehicle 102, and the far perception range includes AOIs more than 250 meters from the autonomous vehicle's 102 location.

Using the example scenario in FIG. 1, a traffic-based classification policy can include a rule such as classifying vehicles within the near perception range (e.g., less than 400 meters from the autonomous vehicle's 102 position) as "track persistently" or "aggressive tracking" if the number of AOIs within the near perception range and in front of the autonomous vehicle 102 is more than a pre-determined number (e.g., twenty AOIs). In another example, the traffic-based classification policy that include rules such as classifying vehicles within the near perception range (e.g., less than 100 meters from the autonomous vehicle's 102 position) as "track persistently" or "aggressive tracking" if the lane in which the autonomous vehicle 102 operates includes two or more AOIs within the near perception range and at least one lane immediately adjacent to the autonomous vehicle's 102 lane includes two or more AOIs. In the above two examples, classification policy can indicate that the AOIs located in the mid-perception range and far perception range can be classified as "track less frequently." In some embodiments, the sensor data processing module can determine, from the sensor data, attributes of the AOIs classified as "track less frequently" at a frequency less than that for the AOIs classified as "track persistently." In some embodiments, the sensor data processing module can determine not to analyze the sensor data to determine attributes of AOIs located in the mid-perception range or far perception range so that computational resources can be preserved for analyzing the AOIs within the near perception range.

In some embodiments, classification policy can include a rule for emergency vehicles (e.g., fire engine, ambulance, police car, etc.) so that such vehicles can be classified as "track persistently" irrespective of their location from the autonomous vehicle as described in Section I or irrespective of the traffic-based policies described in Section II. The sensor data processing module can determine, based on sensor data received from the autonomous vehicle's sensors, that an AOI is an emergency vehicle and can include in an attribute for the AOI an indication that the AOI is an emergency vehicle. The AOI prioritization module can, based on the emergency vehicle indication in the attribute, classify the AOI as "track persistently."

In some embodiments, the classification policy can include a rule that indicates that AOIs located in front of the autonomous vehicle and operated in a same direction as the autonomous vehicle's driving direction can be classified as "track persistently" by the AOI prioritization module. The classification policy can include a rule that indicates that the attributes of the AOIs traveling in a direction opposite to the autonomous vehicle's driving direction are not determined. For example, if the AOI prioritization module determines that the autonomous vehicle is being driven on a highway, then the AOI prioritization module can indicate to the sensor data processing module that the autonomous vehicle is being driven on the highway so that the sensor data processing module can determine not to analyze the sensor data for AOIs traveling in a direction opposite to the autonomous vehicle's direction, thereby saving computational resources, at least because such AOIs have a very low probability of affecting the autonomous vehicle's driving-related operation.

In some embodiments, the classification policy can include a rule that indicates that AOIs located in front of the autonomous vehicle and operated "out of map" can be classified as "track persistently." In some embodiments, an AOI operated "out of map" can include, as an example, an AOI that is traveling in an opposite direction to that of the autonomous vehicle, or an AOI operated in a high-occupancy vehicle (HOV) lane or carpool lane or vanpool lane. The AOI can be determined to be "out of map" by the sensor data processing module based on the sensor data. For example, the sensor data processing module can determine a presence of marking on the road (e.g., double-yellow lines) that indicate that a lane adjacent to the marking is a HOV lane or carpool lane.

In some embodiments, an AOI operated "out of map" can include, as an example, an AOI located in a parking lot. A determination can be made by the AOI prioritization module that the autonomous vehicle is in or close to a parking lot based on the techniques described herein for the traffic intersection. For example, the AOI prioritization module can determine, based on a location of an autonomous vehicle and a previously stored map database, that the autonomous vehicle is located at or within a pre-determined distance of a parking lot. In some embodiments, the classification policy can include a rule that indicates that AOIs located in front of the autonomous vehicle, the AOIs operated "out of map," and the AOIs whose confidence metric is below a threshold value can be classified as "track persistently." The confidence metric can be a metric that indicates a degree of certainty of a three-dimensional projection method with which a bounding box is placed around the AOI.

In some embodiments, the classification policy can include a rule that indicates that an AOI located in front of the autonomous vehicle, but without a bounding box, should be classified as "track persistently." The sensor data processing module can indicate whether an AOI is located in front of, to the left, to the right, or to the rear of the autonomous vehicle. The sensor data processing module can also indicate whether a bounding box is placed around the AOI, as well as the confidence metric associated with the bounding box. In some embodiments, the classification policy can include a rule that indicates that an AOI should not be classified as either "track persistently" or "track less frequently" at least because the sensor data processing module indicates that the AOI is not located in front of the autonomous vehicle and the sensor data processing module indicates that a bounding box cannot be placed around the AOI (e.g., if the object is beyond a far perception range).

The AOIs can be dynamically classified using the classification techniques described in Sections I and II so that a classification of the AOI can be changed from one classification category to another classification category based on updated attributes of the AOI. In some embodiments, based on an attribute of an AOI at a first time, the AOI can be initially classified as "track less frequently" or "domicile tracking," but the same AOI at a second, later, time can be classified as "track persistently" or "aggressive tracking" based on an updated attribute. For example, the AOI prioritization module can determine, based on a location attribute of an AOI, that the AOI located behind the autonomous vehicle and the AOI prioritization module can classify the AOI as "track less frequently" based on a classification policy at a first time. After the first time, the sensor data processing module can update attributes of the AOI based on received sensor data by using a computationally efficient process for the "track less frequently" classification. At a second time, after the first time, if the AOI prioritization module determines that the AOI's speed has exceeded a pre-determined threshold, then the AOI prioritization module can re-classify the AOI as "track persistently." Based on the "track persistently" updated classification, the sensor data processing module can analyze the sensor data at a frequency higher than that used for the "track less frequently" classification.

The classification techniques described herein enable a sensor data processing module to employ a computationally efficient process to determine the attributes of the various AOIs located around the autonomous vehicle. In some embodiments, if AOIs are classified as "track less frequently" or "domicile tracking," the attributes for such AOIs can continue to be determined by the sensor data processing module using a computationally efficient process. A computationally efficient process can include the sensor data processing module analyzing the sensor data to determine attributes of such AOIs at a frequency less than that for the AOIs classified as "track persistently" or "aggressive tracking." However, the AOIs classified as "track less frequently" or "domicile tracking" can still be tracked and the attributes of such AOIs can still be determined so that the autonomous vehicle can safely perform its driving operations to drive with the AOIs. Thus, in some embodiments, attributes of the AOIs classified in categories other than "track persistently" or "aggressive tracking" are not ignored, but can instead be computed using a computationally efficient process.

The computationally efficient process described herein can lead to several technical advantages. For example, since the one or more onboard computers (that include the sensor data processing module and/or the AOI prioritization module) are located in the autonomous vehicle, the computationally efficient process can provide power savings, can minimize disk space needed for storing the attributes of the AOIs over time, and can improve life span of the one or more onboard computers by reducing computational load. The computationally efficient process can provide such technical benefits without sacrificing safety of the autonomous vehicle at least because the attributes of the AOIs can continue to be efficiently determined.

Figure 6:
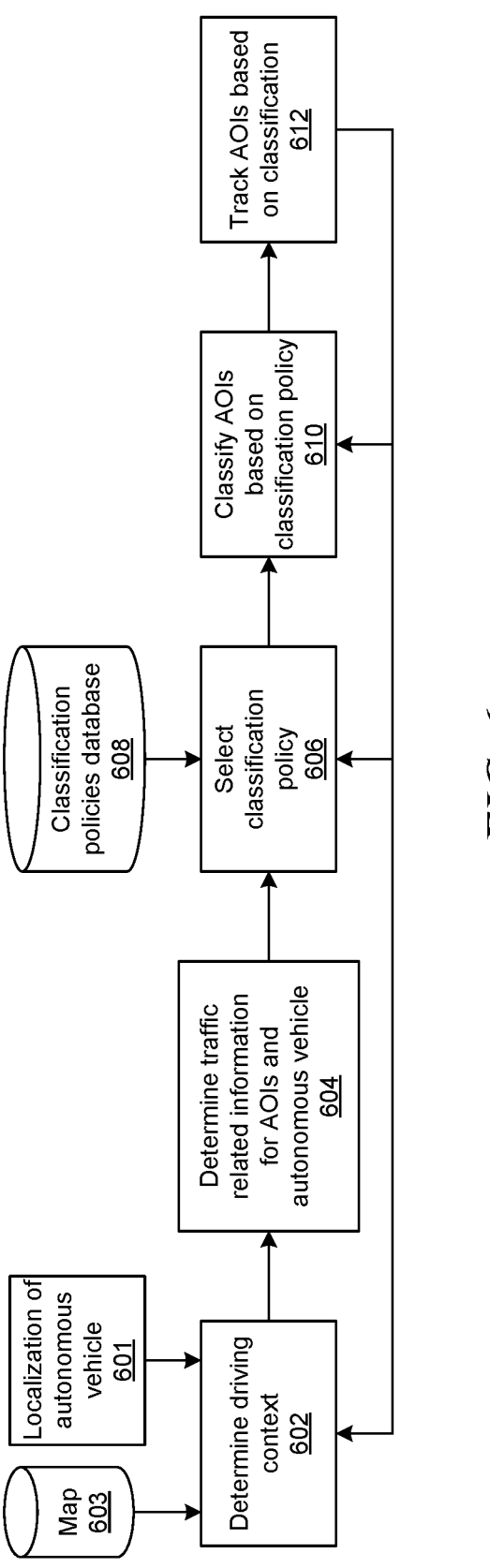
FIG. 6 shows a flowchart of a computationally efficient process based on location-based policy and traffic-based classification policy.

FIG. 6 shows a flowchart of a computationally efficient process based on location-based policy and traffic-based classification policy. At operation 602, the AOI periodization module can determine, based on the localization information 601 of the autonomous vehicle (e.g., GPS position) and a map database 603, a driving context in which the autonomous vehicle is being operated. For example, based on the GPS location and based on information obtained from a map database associated with that GPS location, the AOI prioritization module can determine that the autonomous vehicle is operated on a highway or at or near a traffic intersection.

At operation 604, the sensor data processing module can determine traffic related information of the autonomous vehicle and the traffic related information of the AOIs located around the autonomous vehicle. The traffic related information of the AOIs can be the determined attributes of the AOI. The sensor data processing module can receive sensor data from the multiple sensors located on or in the autonomous vehicle. The sensor data processing module can analyze the sensor data to determine whether AOIs are located around the autonomous vehicle and the AOI's attributes such as the type of AOI (e.g., pedestrian, vehicle, etc.), speed, distance from autonomous vehicle, trajectory of the AOI, lane of AOI relative to autonomous vehicle's lane, direction of travel, predicted trajectory, and the like). The sensor data processing module can also determine traffic density of the AOIs located in, for example, a near perception range, including in the same lane as the autonomous vehicle's and immediately adjacent lane of the autonomous vehicle's lane in the near perception range.

Based on the traffic density and the driving context, the AOI prioritization module can select a classification policy at operation 606. For example, if the sensor data processing module indicates a high traffic density (e.g., the sensor data processing module determine that the number of AOIs in the near perception range is greater than a pre-determined threshold value) and if the AOI prioritization module determines that the autonomous vehicle is operated on a highway, then the AOI prioritization module can select a classification policy suitable for a high traffic density on a highway from a classification policies database 608 stored in the onboard computer (shown as 445 in FIG. 4). The classification policies database 608 can include a plurality of pre-determined classification policies where each classification policies includes rules with which the AOI prioritization module can classify the AOIs located around the autonomous vehicle.

At operation 610, the AOI prioritization module classifies the AOIs located around the autonomous vehicle based on the rules indicated by the selected classification policy. At operation 612, the sensor data processing module can track the AOIs according to their classification. For example, if an AOI is located in the same lane as the autonomous vehicle's lane and within a near perception range of the autonomous vehicle's location, then the AOI prioritization module can classify this AOI as "track persistently" and the sensor data processing module can analyze the sensor data to determine attributes of the AOI based on the "track persistently" classification. As mentioned herein, in some implementations, the sensor data processing module can continue to analyze sensor data at a frequency of 20 times per second to determine attributes of the AOI classified as "track persistently."

After the AOI attributes are determined based on their classifications at operation 612, the process in FIG. 6 can be repeatedly performed as shown by the arrows from operation 612 to operations 602, operation 606, and/or operation 610. By repeatedly performing the operations of FIG. 6, the AOIs can be dynamically classified if their attributes change and/or new or existing AOIs can be properly classified if the context in which the autonomous vehicle is operated changes. For example, based on updated attributes of the classified AOIs determined at operation 612, the AOI prioritization module can re-classify an AOI to a different classification (e.g., from "track less frequently" to "track persistently"). In another example, if the AOI prioritization module determines at operation 602 that the autonomous vehicle that at a first time was driven on a highway within a pre-determined distance of a traffic intersection at a second later time, then the AOI prioritization module and the sensor data processing module can perform operations 604 and 606 to select an appropriate classification policy with which the AOI prioritization module can classify the AOIs located at the traffic intersection.

In yet another example, if the sensor data processing module determines that, over a pre-determined time period, an average amount of time taken to determine the attributes of AOIs exceeds a pre-determined threshold value, then the sensor data processing module at operation 612 can send an indication to the AOI prioritization module to select a classification policy at operation 606 to minimize the number of AOIs classified as "track persistently" or "aggressive tracking." This technique is designed to manage latency so that the sensor data processing module can determine attributes of the AOI in a timely manner and so that the autonomous vehicle can continue to be safely driven based on the determined attributes of the AOIs and based on the trajectory of the autonomous vehicle.

FIG. 4 shows an exemplary block diagram of an onboard computer 400 located in an autonomous vehicle. The onboard computer 400 includes at least one processor 410 and a memory 405 having instructions stored thereupon. The instructions, upon execution by the processor 410, configure the onboard computer 400 to perform the operations related to sensor data processing module 425, the AOI prioritization module 430, the map database 435, the AOI attribute database 440, and/or the classification policies database 445 as described in FIGS. 1 to 3 and in the various embodiments described in this patent document. The transmitter 415 transmits or sends output values to control one or more devices (e.g., engine, lights, transmission, brakes, steering, etc.) on the autonomous vehicle. The receiver 420 receives information or data transmitted or sent by the sensors (e.g., cameras, LiDAR sensors, Radar, GPS unit) on the autonomous vehicle.

FIG. 5 shows an example flowchart of a computationally efficient process to classify and analyze AOIs. Operation 502 includes determining, by a processor, based on a location of the autonomous vehicle and based on a map, an area in which the autonomous vehicle is operated. Operation 504 includes determining, by the processor and based on sensor data received from sensors located on or in the autonomous vehicle, attributes of objects located around the autonomous vehicle, where the attributes include information that describes a status of the objects located around the autonomous vehicle. Operation 506 includes selecting, by the processor and based at least on the area, a classification policy that includes a plurality of rules that are associated with a plurality of classifications to classify the objects. Operation 508 includes, for each of the objects located around the autonomous vehicle, monitoring an object according to a classification of the object based on the classification policy.

In some embodiments, the monitoring the object includes assigning the classification to the object based on the classification policy and based on an attribute of the object, and determining updated attributes of the object by analyzing additional sensor data received after the sensor data is received, wherein the additional sensor data is analyzed using a frequency associated with the classification of the object. In some embodiments, each rule specifies one or more attributes of one object and each rule is associated with one classification, and each classification indicates a frequency with which the updated attributes of the objects are determined.

In some embodiments, the assigning the classification to the object includes determining that the object is associated with the attribute that is same as that included in a rule in the plurality of rules. In some embodiments, the assigning the classification to the object based on the classification policy and based on the attribute of the object includes: determining, based on the attribute of the object, that the object is an emergency vehicle; and assigning, to the emergency vehicle, the classification associated with a highest frequency with which updated attributes of the emergency vehicle are determined.

In some embodiments, the assigning the classification to the object includes: determining that the object is associated with the attribute that is same as that included in two rules in the plurality of rules, where the two rules are associated with two classifications that are indicative of two different frequencies with which the updated attributes of the objects are to be determined; and assigning, based on the determining that the attribute of the object is associated with two rules, the classification to the object, wherein the classification is associated with the frequency that is higher of the two different frequencies.

In some embodiments, the method of FIG. 5 further includes changing, for at least one object located around the autonomous vehicle, a classification from a first classification to a second classification based on updated attributes determined for the at least one object, where the first classification is associated with a first frequency with which the updated attributes of the at last one object are determined, where the second classification is associated with a second frequency with which the updated attributes of the at least one object are to be determined after the changing the classification, and where the second frequency is different from the first frequency.

In some embodiments, the plurality of classifications includes a first classification and a second classification, where the objects located around the autonomous vehicle includes a first object and a second object, where the assigning includes assigning the first classification to the first object and assigning the second classification to the second object, where the first classification indicates that a first set of updated attributes for the first object are determined at a first frequency, where the second classification indicates that a second set of updated driving related attributes for the second object are determined at a second frequency that is different from the first frequency, and where the updated attributes of the first object and the second object are determined based on the first frequency and the second frequency, respectively.

In some embodiments, a system comprising a computer that includes a processor and a memory comprising stored instructions that upon execution configure the processor to perform described in this patent document and, for example, in FIG. 5. In some embodiments, the classification policy is selected based on: the area in which the autonomous vehicle is operated, and a number of objects located within a pre-determined distance of the location of the autonomous vehicle. In some embodiments, the area includes a highway or a freeway.

In some embodiments, the processor is configured to: perform a first determination, based on the location of the autonomous vehicle and based on the map, that the autonomous vehicle is operated at the traffic intersection or is operating within a pre-determined distance of the traffic intersection; and perform a second determination, based on the first determination, that the area is a traffic intersection. In some embodiments, the sensors include cameras, light detection and ranging (LiDAR) sensors, or Radars.

In some embodiments, a non-transitory computer readable storage medium having code stored thereon, the code, when executed by a processor, causing the processor to implement a method described in this patent document and as shown in FIG. 5. In some embodiments, the monitoring the object includes: assigning the classification to the object based on the classification policy and based on an attribute of the object; and determining updated attributes of the object by analyzing additional sensor data received after the sensor data is received, wherein the additional sensor data is analyzed based on the classification of the object. In some embodiments, the attribute includes a distance from the object to the location of the autonomous vehicle. In some embodiments, the object includes a vehicle. In some embodiments, the attribute of the vehicle or the updated attributes of the vehicle includes a speed of the vehicle. In some embodiments, the attribute of the vehicle or the updated attributes of the vehicle includes a predicted trajectory of the vehicle or a driving pattern of the vehicle. In some embodiments, the object includes a pedestrian.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of autonomous driving operation, comprising:

classifying, by a computer located in a first vehicle, a plurality of vehicles located in an area where the first vehicle is operating, wherein the plurality of vehicles are classified into a plurality of ranges based on distances of the plurality of vehicles from the first vehicle, wherein the plurality of vehicles includes a second vehicle that is classified as being in a first range in response to a first distance between the first vehicle and the second vehicle being less than a first value, and wherein the second vehicle is located in a same lane as the first vehicle;

classifying a first set of vehicles located in the first range with a first classification indicative of a first frequency with which the first set of vehicles are tracked, wherein the first set of vehicles are classified with the first classification in response to the first set of vehicles having a number of vehicles located in front of the first vehicle being more than a pre-determined number; and applying brakes of the first vehicle in response to determining a driving related behavior of the second vehicle;

wherein the plurality of vehicles includes a third vehicle that is classified as being in a second range in response to a second distance between the first vehicle and the third vehicle being greater than the first value and less than a second value, and wherein the plurality of vehicles includes a fourth vehicle that is classified as being in a third range in response to a third distance between the first vehicle and the fourth vehicle being greater than the second value;

performing a first determination that an average amount of time taken to determine attributes of the first set of vehicles exceeds a pre-determined threshold value;

reducing, in response to the performing the first determination, a number of vehicles in the first set of vehicles that are tracked using the first classification.

2. The method of claim 1, further comprising:

classifying a second set of vehicles located in the second range and the third range with a second classification indicative of a second frequency with which the second set of vehicles are tracked, wherein the second frequency is less than the first frequency.

3. The method of claim 1, wherein data obtained from sensors located on the first vehicle is not analyzed to determine attributes of a second set of vehicles located in the second range and the third range.

4. The method of claim 1, further comprising:

classifying a third set of vehicles located in front of the first vehicle and operated in a same direction as that of the first vehicle with the first classification.

5. The method of claim 1, wherein attributes of one or more vehicles traveling in a direction opposite to that of the first vehicle are not determined in response to the first vehicle being driven on a highway.

6. A system comprising:

a computer located in a first vehicle, wherein the computer includes a at least one processor and a memory comprising stored instructions that upon execution configure the at least one processor to:

classify a plurality of vehicles located in an area where the first vehicle is operating, wherein the plurality of vehicles are classified into a plurality of ranges based on distances of the plurality of vehicles from the first vehicle, wherein the plurality of vehicles includes a second vehicle that is classified as being in a first range in response to a first distance between the first vehicle and the second vehicle being less than a first value, and wherein the second vehicle is located in a same lane as the first vehicle;

classify a first set of vehicles located in the first range with a first classification indicative of a first frequency with which the first set of vehicles are tracked, wherein the first set of vehicles are classified with the first classification in response to the first set of vehicles having a number of vehicles located in front of the first vehicle being more than a pre-determined number; and applying brakes of the first vehicle in response to determining a driving related behavior of the second vehicle;

wherein the plurality of vehicles includes a third vehicle that is classified as being in a second range in response to a second distance between the first vehicle and the third vehicle being greater than the first value and less than a second value, and wherein the plurality of vehicles includes a fourth vehicle that is classified as being in a third range in response to a third distance between the first vehicle and the fourth vehicle being greater than the second value;

wherein the processor is further configured to:

perform a first determination that an average amount of time taken to determine attributes of the first set of vehicles exceeds a pre-determined threshold value;

reduce, in response to the perform the first determination, a number of vehicles in the first set of vehicles that are tracked using the first classification.

7. The system of claim 6, wherein the processor is further configured to:

classify a second set of vehicles located in the second range and the third range with a second classification indicative of a second frequency with which the second set of vehicles are tracked, wherein the second frequency is less than the first frequency.

8. The system of claim 6, wherein data obtained from sensors located on the first vehicle is not analyzed to determine attributes of a second set of vehicles located in the second range and the third range.

9. The system of claim 6, wherein the processor is further configured to:

classify a third set of vehicles located in front of the first vehicle and operated in a same direction as that of the first vehicle with the first classification.

10. The system of claim 6, wherein attributes of one or more vehicles traveling in a direction opposite to that of the first vehicle are not determined in response to the first vehicle being driven on a highway.

11. A non-transitory computer readable storage medium having code stored thereon, the code, when executed by a processor, causing the processor to implement a method comprising:

classifying, by a computer located in a first vehicle, a plurality of vehicles located in an area where the first vehicle is operating, wherein the plurality of vehicles are classified into a plurality of ranges based on distances of the plurality of vehicles from the first vehicle, wherein the plurality of vehicles includes a second vehicle that is classified as being in a first range in response to a first distance between the first vehicle and the second vehicle being less than a first value, and wherein the second vehicle is located in a same lane as the first vehicle;

classifying a first set of vehicles located in the first range with a first classification indicative of a first frequency with which the first set of vehicles are tracked, wherein the first set of vehicles are classified with the first classification in response to the first set of vehicles having a number of vehicles located in front of the first vehicle being more than a pre-determined number; and applying brakes of the first vehicle in response to determining a driving related behavior of the second vehicle;

wherein the plurality of vehicles includes a third vehicle that is classified as being in a second range in response to a second distance between the first vehicle and the third vehicle being greater than the first value and less than a second value, and wherein the plurality of vehicles includes a fourth vehicle that is classified as being in a third range in response to a third distance between the first vehicle and the fourth vehicle being greater than the second value;

performing a first determination that an average amount of time taken to determine attributes of the first set of vehicles exceeds a pre-determined threshold value;

reducing, in response to the performing the first determination, a number of vehicles in the first set of vehicles that are tracked using the first classification.

12. The non-transitory computer readable storage medium of claim 11, wherein the method further comprises:

classifying a second set of vehicles located in the second range and the third range with a second classification indicative of a second frequency with which the second set of vehicles are tracked, wherein the second frequency is less than the first frequency.

13. The non-transitory computer readable storage medium of claim 11, wherein data obtained from sensors located on the first vehicle is not analyzed to determine attributes of a second set of vehicles located in the second range and the third range.

14. The non-transitory computer readable storage medium of claim 11, wherein the method further comprises:

classifying a third set of vehicles located in front of the first vehicle and operated in a same direction as that of the first vehicle with the first classification.

15. The non-transitory computer readable storage medium of claim 11, wherein attributes of one or more vehicles traveling in a direction opposite to that of the first vehicle are not determined in response to the first vehicle being driven on a highway.

* * * * *